US008393219B2

(12) United States Patent
Hoenes

(10) Patent No.: US 8,393,219 B2
(45) Date of Patent: Mar. 12, 2013

(54) ULTRASONIC TRANSDUCER, ULTRASONIC SENSOR AND METHOD FOR OPERATING AN ULTRASONIC SENSOR

(75) Inventor: Frank Hoenes, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/130,450

(22) PCT Filed: Sep. 24, 2009

(86) PCT No.: PCT/EP2009/062392
§ 371 (c)(1),
(2), (4) Date: Jul. 19, 2011

(87) PCT Pub. No.: WO2010/057708
PCT Pub. Date: May 27, 2010

(65) Prior Publication Data

US 2011/0265572 A1 Nov. 3, 2011

(30) Foreign Application Priority Data

Nov. 21, 2008 (DE) ......................... 10 2008 043 958

(51) Int. Cl.
*G01N 29/00* (2006.01)

(52) U.S. Cl. ........................................... 73/633; 73/649

(58) Field of Classification Search .................... 73/633, 73/618, 649
See application file for complete search history.

(56) References Cited

U.S. PATENT DOCUMENTS

| | | | | |
|---|---|---|---|---|
| 3,987,674 A * | 10/1976 | Baumoel | ..................... | 73/861.28 |
| 5,495,357 A * | 2/1996 | Osterhout | ..................... | 398/107 |
| 5,572,472 A * | 11/1996 | Kearney et al. | ............... | 365/201 |
| 5,585,546 A * | 12/1996 | Gururaja et al. | ............... | 73/1.82 |
| 6,338,716 B1 * | 1/2002 | Hossack et al. | ............... | 600/459 |
| 7,240,556 B2 * | 7/2007 | Georgeson et al. | ............. | 73/641 |
| 8,024,145 B2 * | 9/2011 | McCarthy et al. | .............. | 702/99 |
| 2006/0201252 A1 | 9/2006 | Georgeson et al. | | |
| 2012/0010839 A1 * | 1/2012 | McCarthy et al. | .............. | 702/99 |

FOREIGN PATENT DOCUMENTS

| | | |
|---|---|---|
| DE | 101 39 341 | 2/2002 |
| JP | 2003/248050 | 9/2003 |
| WO | 98/25437 | 6/1998 |

* cited by examiner

*Primary Examiner* — J M Saint Surin
(74) *Attorney, Agent, or Firm* — Kenyon & Kenyon LLP

(57) ABSTRACT

An ultrasonic transducer has an integrated memory for storing a post-pulse oscillation time of the ultrasonic transducer in the uninstalled state.

6 Claims, 1 Drawing Sheet

ULTRASONIC TRANSDUCER, ULTRASONIC SENSOR AND METHOD FOR OPERATING AN ULTRASONIC SENSOR

FIELD OF THE INVENTION

The present invention relates to an ultrasonic transducer, an ultrasonic sensor and to a method for operating an ultrasonic sensor.

BACKGROUND INFORMATION

Ultrasonic sensors use an ultrasonic transducer to convert an electrical excitation signal to an ultrasonic pulse. Based on the mechanical inertia of the ultrasonic transducer, an ultrasonic transducer continues to oscillate even after the end of an electrical excitation signal, and emits an ultrasonic pulse that is extended compared to the electrical excitation. This additional duration is denoted as post-pulse oscillation time.

Ultrasonic transducers are also used to receive echos of ultrasonic pulses. Since an echo cannot be distinguished from a post-pulse oscillation, no electrical signal is evaluated during the post-pulse oscillation time.

The post-pulse oscillation time is subject to a multitude of influences, such as contamination, aging, icing in winter, material fatigue, damage by broken rock, later paint work.

A method is discussed in Japanese patent document JP 2003-248050 which newly determines the post-pulse oscillation time of the ultrasonic transducers in a learning mode, during the operation of an ultrasonic sensor. From the post-pulse oscillation response ascertained, one is able to conclude that there was a malfunction.

SUMMARY OF THE INVENTION

The ultrasonic transducer according to the exemplary embodiments and/or exemplary methods of the present invention includes an integrated memory for storing at least one post-pulse oscillation time of the uninstalled ultrasonic transducer.

This post-pulse oscillation time is independent of influences that act later, such as painting, installation in a bumper, installation in a vehicle, temperature fluctuations, aging. Based on the knowledge of the pure post-pulse oscillation time conditioned by the construction of the ultrasonic transducer, one is able to determine the effects of the environment and of the installation. The storage may take place before or/and after the paint work and/or additional assembly steps. If necessary, a corresponding number of memories is provided, in which the individual post-pulse oscillation times are able to be stored.

The post-pulse oscillation time is able to be read out individually for each ultrasonic transducer. An ultrasonic sensor or the evaluation system (the system could read out the memory and, in the light of the time, release the reception window in a matched manner) is able to set a beginning of the distance measurement after the emission of an ultrasonic pulse, individually for each ultrasonic transducer. The shortest detectable distance may be reduced thereby. The evaluation system is able to read in the post-pulse oscillation time once only, or anew on a regular basis, for instance, at a system start or at the start of the measurement. Alternatively, the reading in of the post-pulse oscillation time is able to take place by a new installation of an individual ultrasonic transducer, for example, during an exchange of a defective ultrasonic transducer. This makes possible a steady adaptation of the evaluation system to the post-pulse oscillation time of the currently installed sensors. Thus, the adaptation takes into account both the sensor-related changes (environmental influences, etc.) and the sensor exchange.

One additional aspect of the exemplary embodiments and/or exemplary methods of the present invention relates to an ultrasonic sensor. It includes at least one ultrasonic transducer, which has an integrated memory, in which a first post-pulse oscillation time of the ultrasonic transducer in the uninstalled state is stored. A readout device is used for reading out the first post-pulse oscillation time from the memory. A measuring device is used for determining a second post-pulse oscillation time of the ultrasonic transducer installed in the ultrasonic sensor, and an evaluation device is used to deactivate the ultrasonic transducer if the second post-pulse oscillation time deviates from the first post-pulse oscillation time by more than one tolerance range, and/or is used to set a flag in the memory if the second post-pulse oscillation time deviates from the first post-pulse oscillation time by more than one tolerance range.

The post-pulse oscillation time of the ultrasonic transducers may be permanently increased by a number of influences. Since the post-pulse oscillation time of a portion of a series of ultrasonic transducers is only able to be stated using a tolerance, conclusions concerning a possible worsening can be drawn only conditionally from current measurements of the post-pulse oscillation time in operation. The comparison of the individual value of the post-pulse oscillation time of the ultrasonic transducer and a current measurement make possible a more accurate detection of a degradation.

The post-pulse oscillation time of the ultrasonic transducers may also be reduced by effects such as broken rock. Since the post-pulse oscillation time of a portion of a series of ultrasonic transducers is only able to be stated using a tolerance, conclusions concerning a possible worsening can be drawn only conditionally from current measurements of the post-pulse oscillation time in operation. The comparison of the individual value of the post-pulse oscillation time of the ultrasonic transducer and a current measurement make possible a more accurate detection of a relevant change. The result of the broken rock may lead to a loss in sensor sensitivity up to total failure.

One further aspect of the exemplary embodiments and/or exemplary methods of the present invention relates to a method for operating an ultrasonic sensor, having the steps: Reading out a first post-pulse oscillation time from an integrated memory of ultrasonic transducers of the ultrasonic sensor; determining a second post-pulse oscillation time of the ultrasonic transducers installed in the ultrasonic sensor; and deactivating the ultrasonic transducers, whose second post-pulse oscillation time deviates from the first post-pulse oscillation time by more than one tolerance range.

The exemplary embodiments and/or exemplary methods of the present invention are explained in the following with reference to specific embodiments and the attached figures.

DETAILED DESCRIPTION

Figure 1:
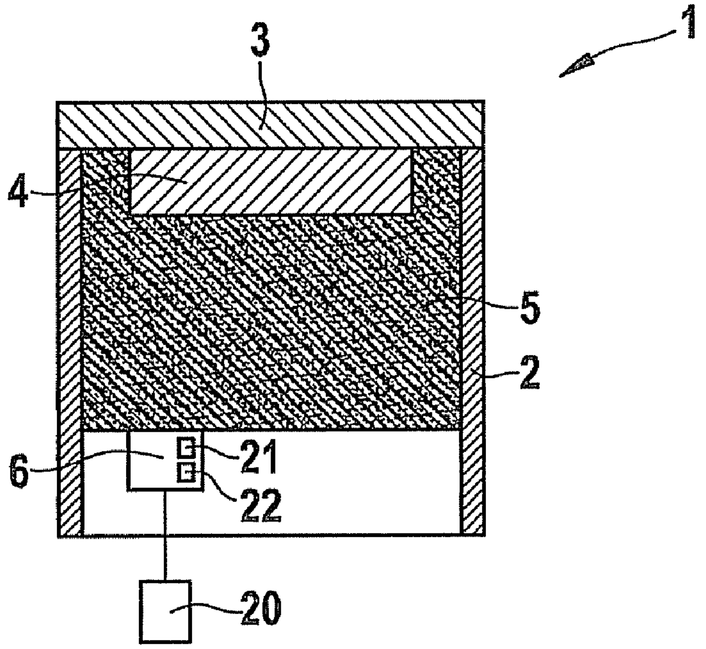
FIG. 1 shows a specific embodiment of an ultrasonic transducer.

FIG. 1 shows a specific embodiment of an ultrasonic transducer 1 in cross section. A diaphragm pot 2 is formed, for instance, by a tube that is open at the top, whose one opening is spanned by a diaphragm 3.

Diaphragm 3 is mechanically connected to an electromechanical transducer 4, which converts an electrical signal to a mechanical motion. Examples of an electromechanical transducer 4 are piezoactive ceramic piles or a coil in the magnetic field of a permanent magnet.

The interior of diaphragm pot 2 may be spray-filled using a foam material 5. Foam material 5 leads to a mechanical connection of electromechanical transducer 4 to diaphragm pot 2. Foam material 5 acts in a damping manner on the oscillating motion of diaphragm. Instead of foam material 5, other damping filler materials may also be used.

Electromechanical transducer 4 may be excited using an electrical periodic signal, whereby diaphragm 3 is set into oscillation of a corresponding frequency. After the switching off of the electrical periodic signal, diaphragm 3 keeps oscillating for a post-pulse oscillation time. The duration of the post-pulse oscillation time is specified by the inertia of diaphragm 3, electromechanical transducer 4 and the damping properties of foam material 5, as well as the (damping) properties of connected electrical circuit 20 to transducer 4. Electrical circuit 20 provides the signal for exciting electromechanical transducer 4, and evaluates the ultrasonic signals of the diaphragm. Electrical circuit 20 is made up at least of an interface 15 and a measuring device 13. In one embodiment it may also include memory 6. There is at least one electrical circuit 20 which is able to excite and evaluate one or more transducers 4.

After the completion of ultrasonic transducer 1, the post-pulse oscillation time is able to be measured in a checking environment or under other known conditions. The post-pulse oscillation time is able to be ascertained individually for each ultrasonic transducer 1 inclusively or exclusively of the associated electronic system 20, or one may take random samples for a portion of ultrasonic transducers 1 with/without electronic system. If transducer 4 is installed as a unit together with electrical circuit 20, the post-pulse oscillation time is yielded for the overall unit. In the case of separately situated units of transducer 4 and electrical circuit 20, the post-pulse oscillation time refers to transducer 4. The combination of transducer 4 and separate electrical circuit 20 yields a greater scatter of the overall post-pulse oscillation time.

The following explanations refer, for the purpose of a simpler description, only to one of the combinations mentioned above, namely a transducer 4 having a separate electronic system 20.

In ultrasonic transducer 1, for instance, a memory 6 is integrated inside diaphragm pot 2 or in electromechanical transducer 4 or in electronic system 20. Examples of memory 6 are EEPROM's and flash memories. The post-pulse oscillation time, ascertained before, of individual, uninstalled ultrasonic transducer 1 is stored in memory 6 of ultrasonic transducer 1, for instance, as post-pulse oscillation time 21.

The post-pulse oscillation time stored in memory 6 (measured, for instance, in the painted state, having decoupling rings, . . . ) is a characteristic property of ultrasonic transducer 1. It is not influenced by further processing, or only negligibly so. The installation of the sensor in the bumper may change the post-pulse oscillation time. This should take place only slightly, however, provided the installation is performed correctly. When the mounting is faulty, the influences may become greater, and may lead to significant deviations of ultrasonic transducers 1 from their uninstalled properties and also with respect to one another. Just on this point, based on the individual post-pulse oscillation time, checking during the first mounting, or even in the case of making repairs, makes it possible to exchange a transducer. The post-pulse oscillation time of transducer 4 may be stored alternatively after the first correct installation, such as in the bumper, again under defined measuring conditions, at a second location in memory 6, as post-pulse oscillation time 22. A comparison of post-pulse oscillation time 21 and 22 takes place using a current measured value. An evaluation may take into account the effect of the temperature on the oscillating behavior. A change over time, an aging, may be ascertained from long-term measurements. A model is able to establish the typical aging as a function of an operating duration and/or the kilometer coverage of a vehicle. This model may be taken into account when comparing a current measurement to stored post-pulse oscillation time 21, 22.

Figure 2:
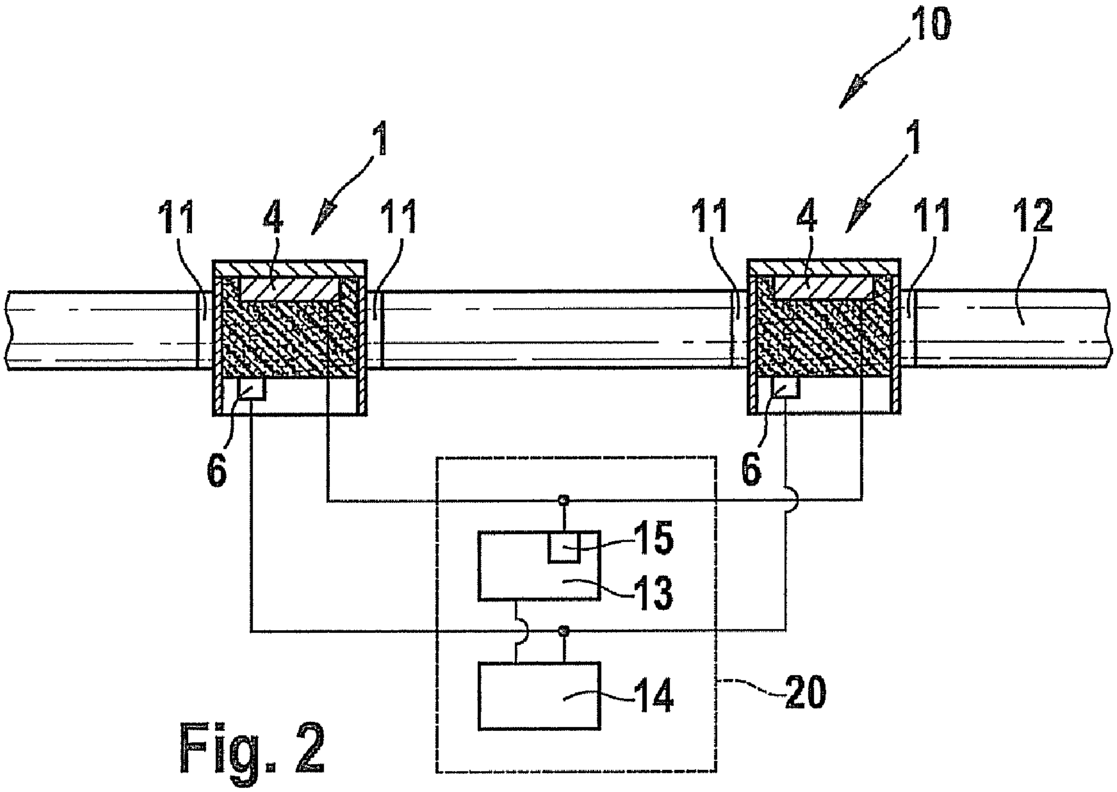
FIG. 2 shows a specific embodiment of an ultrasonic sensor.

FIG. 2 shows an ultrasonic sensor 10 in a partial section. In ultrasonic sensor 10, a plurality of ultrasonic transducers 1, such as two, is installed. The respective post-pulse oscillation time of ultrasonic transducer 1 is stored in a memory 6 of ultrasonic transducers 1.

Ultrasonic transducers 1 are connected, via decoupling rings, to a housing 12 of ultrasonic sensor 10. The housing of ultrasonic sensor 10 may be partially formed by a bumper. Housing 12 may be assembled from several parts, e.g. a housing for accommodating transducer 1 and a second part in the form of the bumper.

Decoupling rings 11 are intended to prevent a cross feed of the oscillation of diaphragm 3 to housing 12. The material properties and the geometry of housing 12 influence, among other things, the post-pulse oscillation time of ultrasonic transducer 1. Housings 12 may be embodied differently for each sensor position. The cross feed is dependent on the embodiment of the installation of ultrasonic transducer 1 and on decoupling rings 11. Therefore, the post-pulse oscillation time for identical ultrasonic transducers 1 may be different after installation in ultrasonic sensor 10 and housing 12.

Paint work later carried out on the transducer is able to change the post-pulse oscillation time. In this instance, both the additional mass of the paint on the diaphragm and the heat treatment for drying the paint have an effect on the post-pulse oscillation time.

Ultrasonic sensor 10 has a measuring device 13. In standard operation, measuring device 13 is used to determine a distance with the aid of the running time of ultrasonic pulses. Measuring device 13 is able to emit an electrical excitation pulse to ultrasonic transducers 1, whereupon diaphragm 3 is excited to oscillation. Furthermore, measuring device 13 records electrical signals of diaphragm 3 when the latter is mechanically excited by an incoming ultrasonic echo. Using an addressing device and a multiplexer device, measuring device 13 is able to address a plurality of transducers 4. Alternatively, each transducer has assigned to it its own measuring device 13. This measuring device 13 may also be integrated into the housing of transducer 4, for example.

In a test operation for ascertaining the post-pulse oscillation time of ultrasonic transducers 1, measuring device 13 may be used installed in ultrasonic sensor 10. The measuring method carried out provides essentially the following steps. Ultrasonic transducer 1 is excited by an electrical excitation pulse. Directly after the ending of the electrical excitation pulse, an electrical signal is recorded that is emitted by ultrasonic transducer 1. Initially, ultrasonic echos are not yet to be expected, for which reason it is assumed that the electrical signal originates with the post-pulse oscillation of diaphragm 3. This should be confirmed by the measuring device or the measuring point in time. What is evaluated is the duration between the end of the electrical excitation pulse and the point in time when the electrical signal of the ultrasonic transducer 1 is below a recording threshold. The evaluation may be repeated several times, particularly when the vehicle is or was moved meanwhile, so as to avoid faulty measurements based on close-by reflecting objects. The duration is assigned to a post-pulse oscillation time of ultrasonic transducer 1 in the installed state.

An evaluation device 14 reads out from memory 6 of ultrasonic transducer 1, for instance, the latter's post-pulse oscillation time in the uninstalled state. For this purpose, appropriate interfaces 15 are provided. The two post-pulse oscillation times in the uninstalled and the installed state are compared to each other. If there is a difference that is greater than the tolerance value, evaluation device 14 detects that ultrasonic transducer 1 is defective or is installed in a faulty manner. Ultrasonic transducer 1 is deactivated or alternatively, measuring device 13 is informed that this ultrasonic transducer 1 is defective, so that, if further distance measurements are made, it is no longer taken into account. Alternatively or in addition, a flag may be set in memory 6 that stores the detection of the defectiveness. A later change in the flag may advantageously be prevented by an appropriate measure. A later repair or a cover-up of a faulty installation may thus be prevented. Measures for preventing a later correction include a once writable storage location, coded storage, etc.

The tolerance value may be specified to evaluation device 14 in a fixed manner.

Alternatively, the tolerance value may be ascertained by evaluation device 14. To do this, evaluation device 14 determines for each ultrasonic transducer 1 the deviation of the post-pulse oscillation time of ultrasonic transducer 1 in the installed and the uninstalled state. The deviation may be ascertained, for example, as the difference or the quotient. The median of the deviation is ascertained as the standard value. If the deviation of an ultrasonic transducer 1 differs from the median by more than one tolerance factor, this ultrasonic transducer 1 is detected as being defective.

In addition, the environmental temperature may also be drawn upon for the evaluation. The continually determined post-pulse oscillation time in the installed state may, in one specific embodiment, be stored in memory 6 as post-pulse oscillation time 23, 24, . . . of ultrasonic transducer 1. This makes it possible to track the long-term behavior of the individual ultrasonic transducers 1. In one further specific embodiment, the storage may be made as a function of the kilometer coverage and/or the temperature (weather conditions).

One embodiment ascertains the tolerance value from the long term behavior. The post-pulse oscillation time in the installed state is determined during a first operating time, for instance, the first 100 operating hours or the first 1000 km of the motor vehicle. The value ascertained is stored and is regarded as the guidance quantity for the post-pulse oscillation time and the tolerance value. The tolerance value or the guidance quantity may be stored in memory 6. In light of this guidance quantity, minor damage by broken rock, for example, may be ascertained by comparison.

One embodiment ascertains the tolerance value from the long term behavior, for instance, during one annual cycle. The post-pulse oscillation is recorded over the typical course of an environmental cycle (summer/winter). The ascertainment of the post-pulse oscillation time over the time period is induced by evaluation unit 14 and electric circuit 20. The shortest and the longest post-pulse oscillation time, along with the appertaining conditions, such as temperature, are stored in memory 6. In addition, the minimum and maximum temperature, at which the post-pulse oscillation test was carried out, may also be stored. (Low or high temperatures do not necessarily have to produce minimum or maximum post-pulse oscillation times). The evaluation device is able to ascertain the expected post-pulse oscillation time from these values. Using the comparison of current post-pulse oscillation time to stored values, one is able to detect the influencing of the measuring device (soiling, icing, damage, . . . ) when a limit is exceeded or undershot.

Memory 6 may be a permanent memory, whose values can no longer be changed. This makes possible a later checking of the individual ultrasonic transducer 1, to see whether it has been installed properly.

The post-pulse oscillation time of uninstalled ultrasonic transducer 1 may be ascertained for different temperatures, emitting performance, etc. The dependencies of the post-pulse oscillation time that is ascertained may also be stored in memory 6, in the form of correction quantities or as a table having corresponding post-pulse oscillation times. Evaluation device 14 of ultrasonic sensor 10 is able to determine the post-pulse oscillation time corresponding to the operating conditions. The time intervals between the emitting of the ultrasonic pulse and the receiving of the echos may be adjusted appropriately. Moreover, an error diagnosis of the individual ultrasonic transducers 1 may be carried out with increased reliability.

What is claimed is:

1. An ultrasonic sensor, comprising:

at least one ultrasonic transducer, which has an integrated memory, in which is stored a first post-pulse oscillation time of the ultrasonic transducer in an uninstalled state, a readout device for reading out the first post-pulse oscillation time from the memory;

a measuring device for determining a second post-pulse oscillation time of the ultrasonic transducer that is built into the ultrasonic sensor; and an evaluation device for at least one of deactivating the ultrasonic transducer, if the second post-pulse oscillation time deviates from the first post-pulse oscillation time by more than one tolerance range, and for setting a flag in the memory, if the second post-pulse oscillation time deviates from the first post-pulse oscillation time by more than one tolerance range.

2. The ultrasonic sensor of claim 1, wherein the at least one ultrasonic transducer includes ultrasonic transducers having at least one additional memory for recording the second post-pulse oscillation time of at least one of a painted ultrasonic transducer and an ultrasonic transducer installed in a bumper.

3. A method for operating an ultrasonic sensor, the method comprising:

reading out a first post-pulse oscillation time of ultrasonic transducers of the ultrasonic sensor from an integrated memory;

determining a second post-pulse oscillation time of the ultrasonic transducers built into the ultrasonic sensor; and at least one of deactivating the ultrasonic transducers and setting a flag in the memory, if a difference between the first post-pulse oscillation time and the second post-pulse oscillation time is greater than a threshold value.

4. The method of claim 3, wherein the threshold value is established as a function of a median of the differences of all the ultrasonic transducers of the ultrasonic sensor.

5. The method of claim 4, wherein the second post-pulse oscillation time of the installed ultrasonic transducer is determined at intervals and the second post-pulse oscillation time is recorded in the memory of the ultrasonic transducer.

6. The method of claim 3, wherein the second post-pulse oscillation time of the installed ultrasonic transducer is determined at intervals and the second post-pulse oscillation time is recorded in the memory of the ultrasonic transducer.

* * * * *

UNITED STATES PATENT AND TRADEMARK OFFICE

CERTIFICATE OF CORRECTION

PATENT NO. : 8,393,219 B2
APPLICATION NO. : 13/130450
DATED : March 12, 2013
INVENTOR(S) : Frank Hoenes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 23 days.

Signed and Sealed this
First Day of September, 2015

Michelle K. Lee
*Director of the United States Patent and Trademark Office*